Jan. 24, 1928.
C. L. KENDALL
1,657,164
FISH BAIT
Filed July 5, 1927
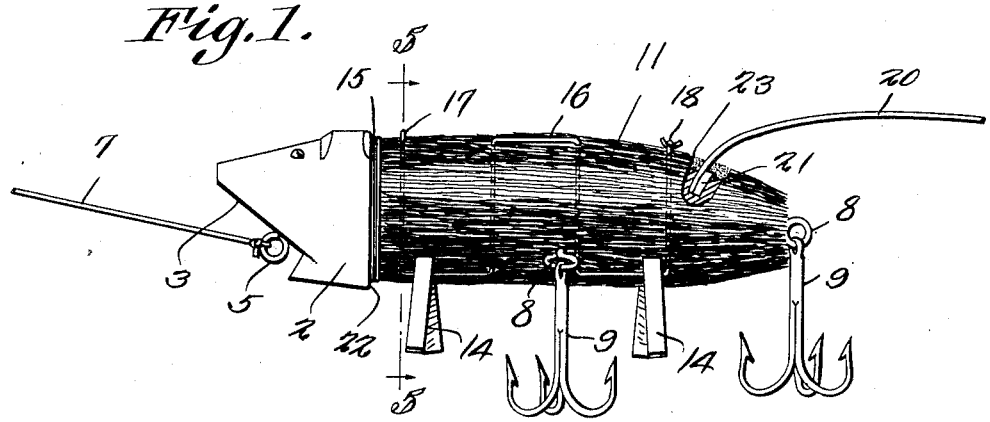
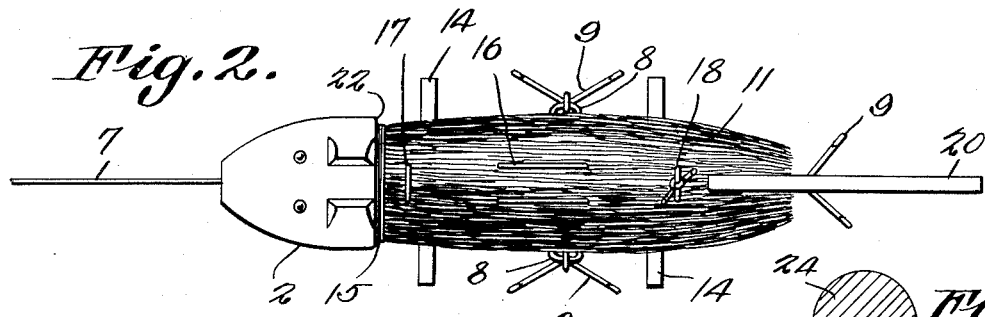
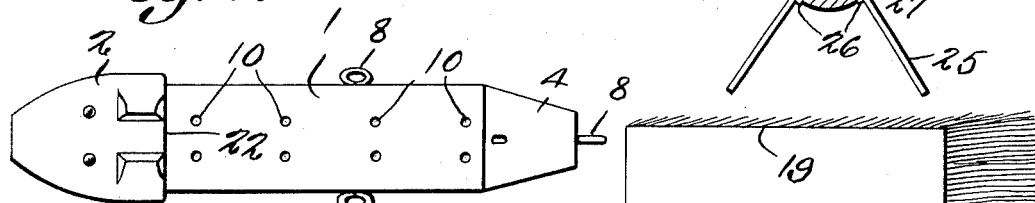
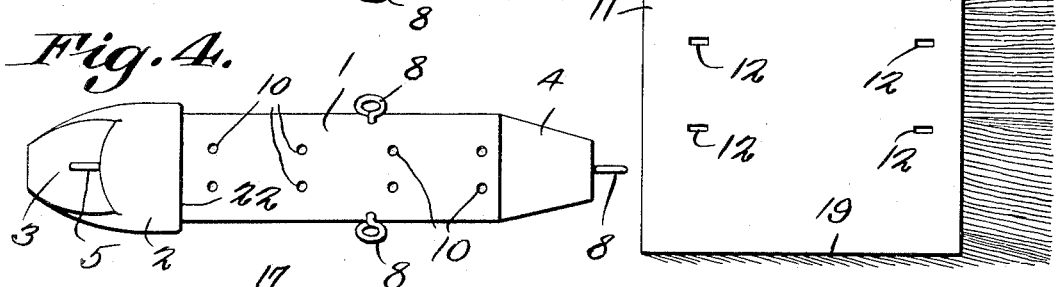
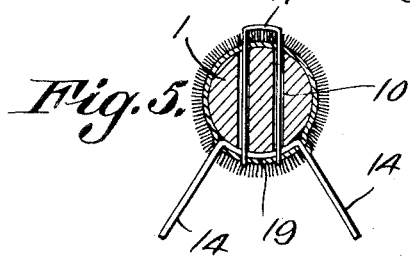
Cloyd L. Kendall, Inventor
By C. A. Snow & Co.
Attorneys.

Patented Jan. 24, 1928.

1,657,164

UNITED STATES PATENT OFFICE.

CLOYD L. KENDALL, OF PERU, INDIANA.

FISH BAIT.

Application filed July 5, 1927. Serial No. 203,646.

This invention is an artificial bait simulating the appearance of a mouse, and one object of the invention is to provide novel means for holding the covering or pelt on the body. Another object of the invention is to provide novel means for holding the legs in place.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a fish bait constructed in accordance with the invention, parts being in section;

Figure 2 is a plan of the complete bait;

Figure 3 is a top plan of the body;

Figure 4 is a bottom plan of the body;

Figure 5 is a cross section on the line 5—5 of Figure 1;

Figure 6 is a plan showing the inside of the covering;

Figure 7 is a cross section showing a modified means for fastening the legs in place.

The bait includes a body 1, made of buoyant material, such as wood, the body being provided at one end with an enlarged head 2 forming a shoulder 22, the head 2 having an inclined under surface 3, and the body 1 having a tapered rear end 4, there being an eye 5 mounted on the inclined surface 3 of the body 1, a line 7 being attached to the eye 5. The bait is intended to ride along the surface of the water and assume an appearance like that of a field mouse which has fallen into the water; and the inclined surface 3 aids in keeping the bait on the surface of the water when the bait is towed along by the line 7. At any desired points on the body 1 there are eyes 8 in which hooks 9 are pivoted. The body 1 has transverse openings 10 disposed in pairs, the pairs being spaced apart lengthwise of the body, as Figures 3 and 4 show clearly.

The body 1 is enclosed within a covering 11 terminating at the shoulder 22, the covering being made of fur or other hairy material, so as to look like the pelt of a mouse. There are openings 12 in the covering 11, and through these openings are extended flexible strips 14 of resilient material, such as rubber. The intermediate portions of the strips 14 are bound between the covering 11 and the body 1, the ends of the strips protruding, to vibrate in water and to represent the legs of a swimming mouse. The covering 11 preferably is cemented about the body 1. A binder 15, such as a piece of cord or thread, is engaged around the covering 11 immediately behind the shoulder 22, and the shoulder protects the binder. A flexible element, such as a piece of cord or thread is formed into a loop the branches 16 of which are extended longitudinally of the body, on the exterior of the covering 11, and through the openings 10, the branches of the flexible element being integrally joined, as at 17, at the forward pair of openings 10, and being joined together by knotting, or otherwise, as shown at 18, at the rear pair of openings. The flexible element, engaged as described, with the body 1 and with the covering 11, forms an important means whereby the covering is held on the body, and, especially, a means whereby the longitudinal edges 19 of the covering 11 are held together, and on the body. The tail 20 may be a piece of rubber held by a plug 21 in an opening 23 in the body 1. In Figure 7, (which discloses a modification) the body is marked by the numeral 24, and the legs 25 are in separate pieces held by plugs 26 in openings 27 in the body 24.

The general construction of the device is such that when it is cast into the water and towed along, it will resemble closely a mouse swinging on the surface of the water.

What is claimed is:—

1. In a device of the class described, a body provided with transverse openings spaced apart lengthwise of the body, a covering on the body, and a flexible element extended longitudinally of the body on the exterior of the covering, and through the openings transversely of the body.

2. A device of the class described, comprising a body, and a covering on the body, the body being provided with transverse openings disposed in pairs, and a flexible element comprising branches which are extended longitudinally of the body on the exterior of the covering, and through the openings transversely of the body, the branches of the flexible element being joined together at the terminal pairs of openings.

3. A device of the class described comprising a body, a covering on the body and having openings, and a flexible element threaded through the openings, the intermediate portion of the flexible element being bound between the covering and the body, and the ends of the flexible element extending outwardly through the openings to form legs.

In testimony that I claim the foregoing as my own, I have hereto affixed my signature.

CLOYD L. KENDALL.